Patented Apr. 15, 1952

2,593,112

UNITED STATES PATENT OFFICE 2,593,112

EMULSIFYING AGENTS

James M. Cross, Belvidere, N. J., and Charles R. Enyeart, Easton, Pa., assignors to General Aniline & Film Corporation, New York, N. Y., a corporation of Delaware No Drawing. Application December 15, 1948, Serial No. 65,535

4 Claims. (Cl. 260—613)

The present invention relates to addition products of ethylene oxide with di-alkylphenols having outstanding properties as emulsifying agents.

In U. S. Patent 2,213,477, issued to Adolf Steindorff et al. on September 3, 1940, are described addition products of ethylene oxide and alkylated phenols in which the alkyl group appearing as a substituent on the phenol ring contains four or more carbon atoms. These products are characterized as being capillary-active and as having utility as wetting, softening, dispersing, emulsifying, washing or cleansing agents.

The phenols prescribed for use in the patent contain, as stated, an alkyl side chain of at least four carbon atoms. The patentee recommends the use, inter alia, of phenols containing several alkyl substituent groups, such as isobutyl-ortho-cresol, tri-isobutyl-phenol, and the like. In all cases where the utilization of di-alkylated phenols is recommended, the second alkyl group is not long chained, i. e., does not contain over four or five carbon atoms.

Products within the category of U. S. Patent 2,213,477, are on the market and are recommended for use as emulsifying agents for water immiscible oils such as, for instance, DDT (1 - trichloro - 2,2 - bis(p-chlorophenyl)ethane. Such emulsions are usually prepared by the emulsification in water by means of an alkyl-phenolethylene oxide addition product of a solution of DDT.

Emulsifying agents generally utilized for the emulsification of DDT and the like are usually prepared by the addition of ethylene oxide to a phenol having a single long alkyl side chain containing eight or more carbon atoms or of a phenol having several relatively short alkyl side chains containing, for instance, four or five carbon atoms. It has been the opinion of the art up to the present time that such compounds represent the ultimate in emulsifying power for products of the type of DDT and the like.

It has now been discovered that products having a far greater emulsifying power than those heretofore recommended can be obtained by adding a plurality of molecules of ethylene oxide, i. e., from about 10–25, to a di-alkylated phenol in which the sum of the carbon atoms in the alkyl substituents is greater than fourteen and wherein each alkyl substituent contains at least six carbon atoms. Such addition products and their use for the emulsification of water immiscible oils constitute the purposes and objects of the present invention.

The di-alkylated phenols, the use of which is contemplated herein, are prepared by the action of the desired olefines upon a phenol in the presence of a gaseous condensing agent, preferably boron fluoride. The alkylation of the phenol is generally effected at about room temperature, i. e., 20° C.

Examples of di-alkylphenols to which the ethylene oxide is to be added are dihexyl- and trihexyl-phenol prepared from hexene-1 and phenol, di-isoheptyl-phenol, di-octyl-phenol, di-octyl-p-cresol, di-octyl-o-cresol, di-decyl-phenol, di-decyl-p-cresol, di-dodecyl-phenol, and the like.

For converting the alkylated phenols to the desired addition products, the phenols are treated with ethylene oxide in the presence of an alkali such as sodium or potassium hydroxide at an elevated temperature, i. e., about 140 to 200° C. Generally, the treatment of the phenol with the ethylene oxide is continued until a 1% solution of the addition product is homogeneous in water to a temperature of about 40° C. The point at which the solution becomes non-homogeneous or cloudy is called the cloud point.

The invention is illustrated by the following examples, but it is to be understood that the invention is not restricted thereto.

Example 1

8.8 parts of gaseous boron trifluoride are added to 188 parts of phenol at about 45° C. To this mixture there were added at 20° C. with good stirring 560.8 parts of decene-1, during a period of 5 hours. After stirring for 18 hours at room temperature, the product was washed with water until neutral, dried and distilled. There was obtained a yield of 221 parts of a material boiling at 168–191° C. at .3 mm. of mercury.

To 63.1 parts of the above dodecyl phenol there was added .19 part of potassium hydroxide and ethylene oxide was introduced at 180° C. until 142.8 parts were absorbed. A 1% solution of this product in water was completely homogeneous up to a temperature of 49° C., at which point cloudiness developed.

Example 2

Dioctyl phenol was prepared by the method described in Example 1 by substituting 448 parts of octene-1 for the decene-1. The yield was 245 parts of a viscous liquid boiling at 145 to 152° C. at .5 mm.

.19 part of potassium hydroxide was added to 60 parts of the dioctyl phenol and the mixture was treated with 117.8 parts of ethylene oxide at 180° C. The cloud point of the resulting product was 53° C.

Example 3

Dioctyl-p-cresol prepared according to the method of Example 1, while substituting octene-1 for the decene-1 and p-cresol for the phenol, and having a boiling point of 144 to 153° C. at .4 mm., was solubilized by treating 60 parts thereof with .18 part of potassium hydroxide and 123 parts of ethylene oxide.

Example 4

Dioctyl-o-cresol, boiling at 148 to 154° C. at .4 mm. of mercury, was prepared according to the method of Example 1 from octene-1 and o-cresol. To 60 parts of dioctyl-o-cresol were added .18 part of potassium hydroxide and 126.7 parts of ethylene oxide. The cloud point of the resulting product was 50° C.

Example 5

A mixture of dihexyl-and-trihexyl-phenol, boiling at 117 to 148° C. at .5 mm., was prepared by treating phenol with hexene-1 according to the procedure of Example 1. To 60.2 parts of the mixture were added .18 part of potassium hydroxide and 134 parts of ethylene oxide at 180° C. The cloud point of the addition product was 40° C.

Example 6

Didodecyl phenol, boiling at 205 to 228° C. at .3 mm., was prepared from dodecene-1 and phenol according to the method of Example 1.

To 60.7 parts of the didodecyl phenol were added .18 part of potassium hydroxide and 152.5 parts of ethylene oxide. The cloud point of the resulting addition product was 51° C.

Example 7

To 376 parts of phenol and 17.5 parts of boron trifluoride, there were added, at 15 to 20° C. during 4.5 hours, 784.8 parts of "Isoheptane" (a commercial product). There were obtained 877 parts of material boiling at 140 to 165° C. at 1.5 mm.

61.7 parts of the dialkylated phenol, obtained as above, were solubilized with 118.3 parts of ethylene oxide in the presence of potassium hydroxide. The cloud point of the addition product was 50° C.

Example 8

The products of Examples 1 to 7 inclusive were utilized for the emulsification of DDT while utilizing as solvents for the DDT the product sold under the name "Solvesso No. 100" (an aliphatic hydrocarbon fraction), xylene, and the product sold under the name "Velsicol A R 50" (chiefly mono- and dimethyl-naphthalenes).

The emulsifying power of the products of Examples 1 to 7 as compared with the emulsifying power of the product sold under the trade name "Triton X 100," recommended for use in the emulsification of DDT by Miscellaneous Publication No. 606, U. S. Department of Agriculture, pages 7 and 8.

The test emulsions were prepared from the following composition:

5 grams DDT per 100 cc. of emulsion.
14 grams solvent per 100 cc. of emulsion.
1 gram (or 2 grams) emulsifier per 100 cc. of emulsion.
Distilled water to make 100 cc.

For the preparation of the emulsion, a stock solution of 23.3% by weight of DDT in the desired solvent is prepared. In the preparation of the actual emulsion, 19 grams of the stock solution is weighed into a 25 ml. beaker and 1 gram (or 2 grams) of emulsifier is dissolved in the stock solution. The solution of DDT and emulsifier is poured carefully down the side of a 100 ml. graduate containing approximately 50 cc. of distilled water. Distilled water is used to rinse the beaker, and the total volume in the graduate is made up to 100 ml.

The mixtures are emulsified by pouring them six times through a 60° 8 inch stem quantitative filtration funnel. The graduate is immediately stopped and tumbled end over end twelve times during one minute. The amount of agitation has been adjusted so that with 2 grams of the aforesaid commercial "Triton" emulsifier per 100 cc. of condensative emulsion product, creaming of the emulsion occurs in approximately 24 hours.

The results of the tests are indicated in the following table, the indication of superiority being based upon either a shortness in the time of creaming of the emulsion, or in stability of the emulsion for longer periods of time after creaming:

TABLE 1

*Emulsification tests*

| Example | "Solvesso," B. P. 311–327° C. | Xylene | "Velsicol A R 50" |
|---|---|---|---|
| 1 | much better | much better | better. |
| 2 | better | better | Do. |
| 3 | do | do | Do. |
| 4 | do | do | equal. |
| 5 | much better | do | better. |
| 6 | do | much better | Do. |
| 7 | better | better | Do. |

It is to be pointed out that the language used in the comparison has been selected because of the inability to fix in terms of exact figures the performance of the emulsifying agents.

Example 9

Didodecyl phenol, boiling at 215 to 228° C. at .3 mm., was reacted with 19.6 equivalents of ethylene oxide at 150 to 165° C. in the presence of .5% by weight of sodium hydroxide. A 1% solution in water is cloudy, hence the cloud point is not readily determinable.

Example 10

Dioctyl phenol prepared as above was reacted with 9.97 equivalents of ethylene oxide in the presence of potassium hydroxide.

Example 11

Didecyl phenol was reacted with 14.3 equivalents of ethylene oxide in the presence of potassium hydroxide.

Example 12

100 grams of mineral oil and 5 grams of the product of Example 9 were mixed to form a stock solution. 50 cc. of this stock solution were added to 50 cc. of distilled water and the mixture shaken twenty times to effect emulsification and to observe its stability.

An emulsion readily occurs, whereas when using in lieu of the product of Example 9 a commercial emulsifier, i. e., the addition product of ethylene oxide and castor oil fatty acid, a stable emulsion is not formed.

Example 13

The procedure is the same as in Example 12, excepting that the mineral oil is replaced by oleic acid and the product of Example 9 by the product of Example 11. Emulsification again readily occurs. The formation of a stable emulsion does not take place when replacing the product of Example 11 by another standard emulsifier, i. e., the addition product of ethylene oxide to oleic acid.

Various modifications of the invention will occur to persons skilled in the art, and we therefore do not intend to be limited in the patent granted except as necessitated by the prior art and the appended claims.

We claim:

1. The product of the following formula:

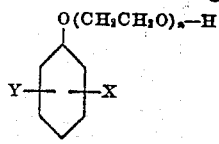

wherein X and Y are alkyl groups, each containing at least 6 carbon atoms, the sum of the carbon atoms in X and Y exceeding 14, and $n$ is a whole number ranging from 10 to 25.

2. The product of the following formula:

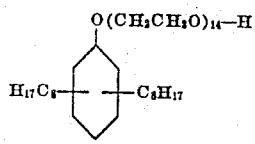

3. The product of the following formula:

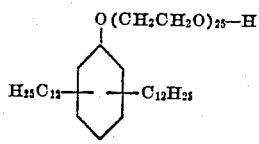

4. The product of the following formula:

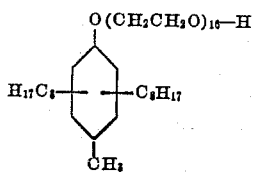

JAMES M. CROSS.
CHARLES R. ENYEART.

REFERENCES CITED

The following references are of record in the file of this patent:

UNITED STATES PATENTS

| Number | Name | Date |
|---|---|---|
| 2,098,203 | Bruson | Nov. 2, 1937 |
| 2,213,477 | Steindorff et al. | Sept. 3, 1940 |
| 2,516,152 | Schulze et al. | July 25, 1950 |